(12) United States Patent
Peng et al.

(10) Patent No.: US 12,471,686 B2
(45) Date of Patent: Nov. 18, 2025

(54) HINGE MECHANISM, PROTECTIVE CASE FOR ELECTRONIC DEVICE, AND ELECTRONIC DEVICE ASSEMBLY

(71) Applicant: Honor Device Co., Ltd., Shenzhen (CN)

(72) Inventors: Yongfeng Peng, Shenzhen (CN); Guoliang Huo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/032,252

(22) PCT Filed: Aug. 17, 2022

(86) PCT No.: PCT/CN2022/112974
§ 371 (c)(1),
(2) Date: Apr. 17, 2023

(87) PCT Pub. No.: WO2023/029997
PCT Pub. Date: Mar. 9, 2023

(65) Prior Publication Data
US 2024/0049850 A1 Feb. 15, 2024

(30) Foreign Application Priority Data
Sep. 3, 2021 (CN) .......................... 202111034548.4

(51) Int. Cl.
*A45C 13/00* (2006.01)
*A45C 11/00* (2006.01)
*F16C 11/04* (2006.01)

(52) U.S. Cl.
CPC ............ *A45C 13/005* (2013.01); *A45C 11/00* (2013.01); *F16C 11/04* (2013.01); *A45C 11/002* (2025.01); *A45C 11/003* (2025.01)

(58) Field of Classification Search
CPC .. G06F 1/1628; G06F 1/1681; H04M 1/0216; H04M 1/0218; H04M 1/022; E05D 3/122
(Continued)

(56) References Cited

U.S. PATENT DOCUMENTS 8,573,394 B2 * 11/2013 Ahee ...................... G06F 1/1662
206/320
9,310,848 B2 * 4/2016 Fujino ................... G06F 1/1681
(Continued)

FOREIGN PATENT DOCUMENTS

| CN | 102902357 A | 1/2013 |
|---|---|---|
| CN | 203548549 U | 4/2014 |

(Continued)

*Primary Examiner* — Chun Hoi Cheung
(74) *Attorney, Agent, or Firm* — Slater Matsil, LLP

(57) ABSTRACT

A hinge mechanism is applied to—a protective case. A first rotating shaft assembly in the hinge mechanism is fixedly connected to a first portion of the protective case, and is further rotatably connected to a second portion of the protective case. A second rotating shaft assembly in the hinge mechanism is fixedly connected to the second portion of the protective case, and is further rotatably connected to a third portion of the protective case. When the second portion of the protective case rotates relative to the first portion of the protective case by using the first rotating shaft assembly, a transmission part that cooperates with both the first rotating shaft assembly and the second rotating shaft assembly is configured to drive the third portion of the protective case to rotate relative to the second portion of the protective case by using the second rotating shaft assembly.

20 Claims, 10 Drawing Sheets

(58) Field of Classification Search
USPC .................. 455/575.8; 16/354; 206/320; 361/679.28, 679.27, 679.17
See application file for complete search history.

(56) References Cited

U.S. PATENT DOCUMENTS

| | | | |
|---|---|---|---|
| 10,216,232 B1* | 2/2019 | Zhu | G06F 1/1656 |
| 2004/0203513 A1 | 10/2004 | Kwon | |
| 2014/0360296 A1* | 12/2014 | Hsu | G06F 1/1679 |
| | | | 74/98 |
| 2016/0187937 A1* | 6/2016 | Ahee | A45C 13/005 |
| | | | 361/679.09 |
| 2019/0056768 A1* | 2/2019 | Lin | G06F 1/1681 |
| 2020/0117284 A1* | 4/2020 | Kulkarni | G06F 3/0227 |
| 2022/0086265 A1 | 3/2022 | Shang | |
| 2022/0316559 A1 | 10/2022 | Jia | |
| 2023/0049295 A1* | 2/2023 | Hillyerd | G06F 1/1637 |

FOREIGN PATENT DOCUMENTS

| | | |
|---|---|---|
| CN | 205485786 U | 8/2016 |
| CN | 208901017 U | 5/2019 |
| CN | 112344170 A | 2/2021 |
| CN | 212906226 U | 4/2021 |
| CN | 213659288 U | 7/2021 |
| CN | 113273785 A | 8/2021 |
| CN | 113946181 A | 1/2022 |
| EP | 4072109 A1 | 10/2022 |
| WO | 0184728 A1 | 11/2001 |
| WO | 2015172414 A1 | 11/2015 |
| WO | 2020147633 A1 | 7/2020 |
| WO | 2021121104 A1 | 6/2021 |

\* cited by examiner

HINGE MECHANISM, PROTECTIVE CASE FOR ELECTRONIC DEVICE, AND ELECTRONIC DEVICE ASSEMBLY

CROSS-REFERENCE TO RELATED APPLICATIONS

This application is a national stage of International Application No. PCT/CN2022/112974, filed on Aug. 17, 2022, which claims priority to Chinese Patent Application No. 202111034548.4, filed on Sep. 3, 2021. The disclosures of both of the aforementioned applications are hereby incorporated by reference in their entireties.

TECHNICAL FIELD

Embodiments of this application relate to the field of terminal technologies, and in particular, to a hinge mechanism, a protective case for an electronic device, and an electronic device assembly.

BACKGROUND

Currently, electronic devices such as computers and mobile phones are inseparable from our lives, are seen everywhere in our lives, and greatly improve living standards of people. Among them, a portable tablet computer is convenient and efficient, has a powerful function, and integrates the function of amusement and work, and is therefore favored by many users. The tablet computer is generally configured with a protective case, and the tablet computer can protect the tablet computer from being scratched and serve as a support to support the tablet computer. In addition, the tablet computer can be brought into a working state or a standby state by opening or closing a protective cover of the protective case for the tablet computer.

In a related technology, the protective case for the tablet computer generally includes three support structures, and soft rubber is also disposed between two adjacent support structures, so that relative rotation can be implemented between the two adjacent support structures. For example, the three support structures include a first support portion, a second support portion, and a third support portion. The second support portion is rotatably connected to the first support portion by using a soft rubber portion, and the second support portion is rotatably connected to the third support portion by using a soft rubber portion. In actual application, the first support portion is fastened to a back surface of the tablet computer, the third support portion is parallel to a desktop, and the second support portion is located between the first support portion and the third support portion, to form an entire flap-type cover plate for protecting and supporting the tablet computer.

However, when the foregoing protective case for the tablet computer supports the tablet computer, only single-angle supporting can be performed, and an adjustment of a random support angle cannot be implemented, and consequently, a use requirement of a user in more application scenarios cannot be met.

SUMMARY

This application provides a hinge mechanism, a protective case for an electronic device, and an electronic device assembly, to implement an adjustment of a random support angle of the electronic device, so as to meet a use requirement of a user in more application scenarios and improve use performance of the electronic device.

According to a first aspect, an embodiment of this application provides a hinge mechanism, applied to a protective case for an electronic device and including at least: a first rotating shaft assembly, a second rotating shaft assembly, and a transmission part that cooperates with both the first rotating shaft assembly and the second rotating shaft assembly, where the first rotating shaft assembly is fixedly connected to a first portion of the protective case, and the first rotating shaft assembly is further rotatably connected to a second portion of the protective case; the second rotating shaft assembly is fixedly connected to the second portion of the protective case, and the second rotating shaft assembly is further rotatably connected to a third portion of the protective case; when the second portion of the protective case rotates relative to the first portion of the protective case by using the first rotating shaft assembly, the transmission part drives the third portion of the protective case to rotate relative to the second portion of the protective case by using the second rotating shaft assembly; and the second portion of the protective case is located between the first portion of the protective case and the third portion of the protective case.

According to the hinge mechanism provided in this embodiment of this application, the first rotating shaft assembly in the hinge mechanism is fixedly connected to the first portion of the protective case, and is further rotatably connected to the second portion of the protective case, the second rotating shaft assembly in the hinge mechanism is fixedly connected to the second portion of the protective case, and is further rotatably connected to the third portion of the protective case, and the transmission part in the hinge mechanism cooperates with both the first rotating shaft assembly and the second rotating shaft assembly. In this way, when the second portion of the protective case rotates relative to the first portion of the protective case by using the first rotating shaft assembly, the transmission part can drive the third portion of the protective case to rotate relative to the second portion of the protective case by using the second rotating shaft assembly. That is, when the second portion of the protective case rotates relative to the first portion of the protective case, the third portion of the protective case rotates relative to the second portion of the protective case in synchronization, to implement adjustments of different angles. Therefore, the hinge mechanism can implement an adjustment of a random support angle of the electronic device, so that a use requirement of a user in more application scenarios can be met, thereby improving use performance of the electronic device.

In a possible implementation, the first rotating shaft assembly includes: a first rotating shaft and a first fastening assembly rotatably connected to the first rotating shaft; the first rotating shaft is fixedly connected to the second portion of the protective case, and the first fastening assembly is fixedly connected to the first portion of the protective case; the second rotating shaft assembly includes: a second rotating shaft and a second fastening assembly rotatably connected to the second rotating shaft; and the second rotating shaft is fixedly connected to the third portion of the protective case, and the second fastening assembly is fixedly connected to the second portion of the protective case.

The first rotating shaft in the first rotating shaft assembly is fixedly connected to the second portion of the protective case, the first fastening assembly in the first rotating shaft assembly is fixedly connected to the first portion of the protective case, and the first rotating shaft is rotatably connected to the first fastening assembly, so that the second portion of the protective case rotates relative to the first portion of the protective case by using the first rotating shaft assembly. The second rotating shaft in the second rotating shaft is fixedly connected to the third portion of the protective case, the second fastening assembly in the second rotating shaft assembly is fixedly connected to the second portion of the protective case, and the second rotating shaft is rotatably connected to the second fastening assembly, so that the third portion of the protective case rotates relative to the second portion of the protective case by using the second rotating shaft assembly.

In a possible implementation, the first fastening assembly includes: a first fastening base and a first structural part fixedly connected to the first fastening base; the first rotating shaft is rotatably connected to the first fastening base, and the first structural part is fixedly connected to the first portion of the protective case; the second fastening assembly includes: a second fastening base and a second structural part fixedly connected to the second fastening base; and the second rotating shaft is rotatably connected to the second fastening base, and the second structural part is fixedly connected to the second portion of the protective case.

The first rotating shaft in the first rotating shaft assembly is rotatably connected to the first fastening base in the first fastening assembly, the first structural part in the first fastening assembly is fixedly connected to the first portion of the protective case, and the first fastening base is fixedly connected to the first structural part. In this way, the first rotating shaft in the first rotating shaft assembly is rotatably connected to the first fastening assembly, the first fastening assembly is fixedly connected to the first portion of the protective case, so that the first rotating shaft rotates relative to the first portion of the protective case. In addition, by disposing the first structural part, the first portion of the protective case is fixedly connected to the first fastening base by using the first structural part, and connection area between the first fastening base and the first portion of the protective case can be increased, so that stability of a connection between the first fastening base and the first portion of the protective case can be improved.

The second rotating shaft in the second rotating shaft assembly is rotatably connected to the second fastening base in the second fastening assembly, the second structural part in the second fastening assembly is fixedly connected to the second portion of the protective case, and the second fastening base is fixedly connected to the second structural part. In this way, the second rotating shaft in the second rotating shaft assembly is rotatably connected to the second fastening assembly, and the second fastening assembly is fixedly connected to the second portion of the protective case, so that the second rotating shaft rotates relative to the second portion of the protective case. In addition, by disposing the second structural part, the second portion of the protective case is fixedly connected to the second fastening base by using the second structural part, and connection area between the second fastening base and the second portion of the protective case can be increased, so that stability of a connection between the second fastening base and the second portion of the protective case can be improved.

In a possible implementation, the first fastening base includes: a first base plate and two first side plates that are disposed opposite to each other; the two first side plates are both connected to the first base plate, and the two first side plates are located on a same side of the first base plate; one end that is of each of the two first side plates and that is away from the first base plate is provided with a first groove, and the first rotating shaft is located in the first groove;

the second fastening base includes: a second base plate and two second side plates that are disposed opposite to each other; the two second side plates are both connected to the second base plate, and the two second side plates are located on a same side of the second base plate; and one end that is of each of the two second side plates and that is away from the second base plate is provided with a second groove, and the second rotating shaft is located in the second groove.

The one end that is of each of the two first side plates of the first fastening base and that is away from the first base plate is provided with the first groove, and the first rotating shaft is located in the first groove. In this way, the first rotating shaft can freely rotate along an inner wall of the first groove, so that the first rotating shaft is rotatably connected to the first fastening base.

The one end that is of each of the two second side plates of the second fastening base and that is away from the second base plate is provided with the second groove, and the second rotating shaft is located in the second groove. In this way, the second rotating shaft can freely rotate along an inner wall of the second groove, so that the second rotating shaft is rotatably connected to the second fastening base.

In a possible implementation, the second fastening assembly further includes a first clamping part; and the first clamping part is connected to one end that is of the second structural part and that is away from the second fastening base. The first clamping part is configured to limit a movement range of the transmission part, to avoid slipping of the transmission part, or avoid a problem that a moving direction of the transmission part does not match a moving direction of each of the first rotating shaft and the second rotating shaft.

In a possible implementation, the first clamping part includes: a first plate portion and a first bent portion connected to the first plate portion; the first plate portion is connected to the second structural part, and the first plate portion and the second structural part are located on a same plane; and a first avoiding space for the transmission part to pass through is formed between the first bent portion and the first plate portion.

The first plate portion of the first clamping part is connected to the second structural part, the first plate portion and the second structural part are located on a same plane, the first bent portion of the first clamping part is connected to the first plate portion, and the first avoiding space for the transmission part to pass through is formed between the first bent portion and the first plate portion. In this way, the transmission part passes through the first avoiding space formed between the first bent portion and the first plate portion, and the first avoiding space can limit a movement range of the transmission part, to avoid slipping of the transmission part, or avoid a problem that a moving direction of the transmission part does not match a moving direction of each of the first rotating shaft and the second rotating shaft.

In a possible implementation, the first rotating shaft assembly further includes a third structural part; the third structural part is fixedly connected to the first rotating shaft, and the third structural part is further fixedly connected to the second portion of the protective case; and the second rotating shaft assembly further includes a fourth structural part; and the fourth structural part is fixedly connected to the second rotating shaft, and the fourth structural part is further fixedly connected to the third portion of the protective case.

By disposing the third structural part, the third structural part is fixedly connected to the first rotating shaft, and the third structural part is fixedly connected to the second portion of the protective case, so that the first rotating shaft is fixedly connected to the second portion of the protective case by using the third structural part, and connection area between the first rotating shaft and the second portion of the protective case can be increased, thereby improving stability of a connection between the first rotating shaft and the second portion of the protective case.

By disposing the fourth structural part, the fourth structural part is fixedly connected to the second rotating shaft, and the fourth structural part is fixedly connected to the third portion of the protective case, so that the second rotating shaft is fixedly connected to the third portion of the protective case by using the fourth structural part, and connection area between the second rotating shaft and the third portion of the protective case can be increased, thereby improving stability of a connection between the second rotating shaft and the third portion of the protective case.

In a possible implementation, the first rotating shaft assembly further includes a second clamping part; and one end of the second clamping part is connected to the third structural part, and the other end of the second clamping part is connected to the first rotating shaft. The second clamping part is further configured to limit the movement range of the transmission part, to avoid slipping of the transmission part, or avoid the problem that the moving direction of the transmission part does not match the moving direction of each of the first rotating shaft and the second rotating shaft.

In a possible implementation, the second clamping part includes: a second plate portion and a third plate portion vertically connected to the second plate portion; the second plate portion is connected to each of the third structural part and the first rotating shaft, and the second plate portion and the third structural part are located on a same plane; and a second avoiding space for the transmission part to pass through is formed on the third plate portion.

The second plate portion of the second clamping part is connected to each of the third structural part and the first rotating shaft, the second plate portion and the third structural part are located on a same plane, the third plate portion of the second clamping part is vertically connected to the second plate portion, and the second avoiding space for the transmission part to pass through is formed on the third plate portion. In this way, the transmission part passes through the second avoiding space formed on the third plate portion, and the second avoiding space can limit a movement range of the transmission part, to avoid slipping of the transmission part, or avoid the problem that the moving direction of the transmission part does not match the moving direction of each of the first rotating shaft and the second rotating shaft.

In a possible implementation, one end of the transmission part passes through the second avoiding space and cooperates with the first rotating shaft, and the other end of the transmission part passes through the first avoiding space and cooperates with the second rotating shaft. In this way, the transmission part cooperates with the first rotating shaft and the second rotating shaft, and the movement range of the transmission part can be limited to some extent, to avoid slipping of the transmission part, or avoid the problem that the moving direction of the transmission part does not match the moving direction of each of the first rotating shaft and the second rotating shaft.

In a possible implementation, the transmission part is a gear rack. The gear rack is a special gear whose teeth are distributed on a strip. The gear rack falls into two types: a straight-toothed gear rack and a helical-toothed gear rack. The straight-toothed gear rack and the helical-toothed gear rack are respectively paired with a straight-toothed cylindrical gear and a helical-toothed cylindrical gear for use. A tooth profile of the gear rack is a straight line rather than an involute (a plane for a tooth surface), and the gear rack is equivalent to a cylindrical gear with infinite radius of a divided circle.

In a possible implementation, at least a part of an outer periphery of the first rotating shaft is provided with a first toothed structure, and the first toothed structure is engaged with at least a part of the gear rack; and at least a part of an outer periphery of the second rotating shaft is provided with a second toothed structure, and the second toothed structure is engaged with at least a part of the gear rack.

The at least a part of the outer periphery of the first rotating shaft is provided with the first toothed structure, to form a first gear, and the first gear is engaged with the at least a part of the gear rack, so that the first rotating shaft cooperates with the gear rack serving as the transmission part. The at least a part of the outer periphery of the second rotating shaft is provided with the second toothed structure, to form a second gear, and the second gear is engaged with the at least a part of the gear rack, so that the second rotating shaft cooperates with the gear rack serving as the transmission part.

In a possible implementation, the first rotating shaft includes: a first function portion and a first connecting portion connected to the first function portion; at least a part of an outer periphery of the first function portion is provided with the first toothed structure, and the first toothed structure is engaged with at least a part of the gear rack; the second rotating shaft includes: a second function part and a second connecting part connected to the second function part; and at least a part of an outer periphery of the second function portion is provided with the second toothed structure, and the second toothed structure is engaged with at least a part of the gear rack.

In a possible implementation, at least one torsion spring is further included; and the torsion spring is sleeved onto the first connecting portion, one end of the torsion spring abuts on the first side plate, and the other end of the torsion spring abuts on the second clamping part.

By disposing the at least one torsion spring, the torsion spring is sleeved onto the first connecting portion of the first rotating shaft, one end of the torsion spring abuts on the first side plate of the first fastening base, and the other end of the torsion spring abuts on the second clamping part, so that the torsion spring can provide torsion energy storage. For example, a torsion force of the torsion spring may be designed as a torque equivalent to the weight of the electronic device.

In a possible implementation, the first rotating shaft assembly further includes at least one first fastener; the first fastener is sleeved onto the first connecting portion; a first protrusion portion is disposed on the first fastener, the first protrusion portion cooperates with the first groove, to limit the first rotating shaft in an annular space surrounded by the first protrusion portion and the first groove; the second rotating shaft assembly further includes at least one second fastener; the second fastener is sleeved onto the second connecting portion; and a second protrusion portion is disposed on the second fastener, and the second protrusion portion cooperates with the second groove, to limit the second rotating shaft in an annular space surrounded by the second protrusion portion and the second groove.

The at least one first fastener is sleeved onto the first connecting portion of the first rotating shaft, the first fastener includes the first protrusion portion, and the first protrusion portion cooperates with the first groove provided on the first fastening base, so that the first rotating shaft is located in the first groove, and the annular space surrounded by the first protrusion portion and the first groove can be used to limit the first rotating shaft, so as to ensure that the first rotating shaft can freely rotate along the inner wall of the first groove, and avoid a problem that the first rotating shaft falls off from the first groove. In addition, the first fastener can further limit a cooperation region of the transmission part on the first rotating shaft, to ensure that the transmission part cooperates with the first function portion of the first rotating shaft.

The at least one second fastener is sleeved onto the second connecting portion of the second rotating shaft, the second fastener includes the second protrusion portion, and the second protrusion portion cooperates with the second groove provided on the second fastening base, so that the second rotating shaft is located in the second groove, and the annular space surrounded by the second protrusion portion and the second groove can be used to limit the second rotating shaft, so as to ensure that the second rotating shaft can freely rotate along the inner wall of the second groove, and avoid a problem that the second rotating shaft falls off from the second groove. In addition, the second fastener can further limit a cooperation region of the transmission part on the second rotating shaft, to ensure that the transmission part cooperates with the second function portion of the second rotating shaft.

In a possible implementation, the first rotating shaft assembly further includes at least one third fastener; the third fastener is sleeved onto the first connecting portion, and the third fastener is located on a side that is of the first fastener and that is away from the side plate; the second rotating shaft assembly further includes at least one fourth fastener; and the fourth fastener is sleeved onto the second connecting portion, and the fourth fastener is located on a side that is of the second fastener and that is away from the side plate.

The at least one third fastener is sleeved onto the first connecting portion of the first rotating shaft, and the third fastener is located on the side that is of the first fastener and that is away from the side plate of the first fastening base, so that the third fastener can further limit the cooperation region of the transmission part on the first rotating shaft, to ensure that the transmission part cooperates with the first function portion of the first rotating shaft.

The at least one fourth fastener is sleeved onto the second connecting portion of the second rotating shaft, and the fourth fastener is located on the side that is of the second fastener and that is away from the side plate of the second fastening base, so that the fourth fastener can further limit the cooperation region of the transmission part on the second rotating shaft, to ensure that the transmission part cooperates with the second function portion of the second rotating shaft.

In a possible implementation, at least one first friction plate is disposed between the first fastener and the third fastener. The friction plate can provide a specific friction force, to more firmly fasten the first fastener and the third fastener to the first connecting portion of the first rotating shaft.

According to a second aspect, an embodiment of this application provides a protective case for an electronic device, including: a protective case body and any one of the hinge mechanisms; the protective case body includes: a first portion, a second portion, and a third portion, and the second portion is located between the first portion and the third portion; and a first rotating shaft assembly of the hinge mechanism is connected to each of the first portion and the second portion, a second rotating shaft assembly of the hinge mechanism is connected to each of the second portion and the third portion, and a transmission part of the hinge mechanism is located on the second portion.

According to the protective case for the electronic device provided in this embodiment of this application, the protective case for the electronic device includes at least the hinge mechanism. In the hinge mechanism, the first rotating shaft assembly is fixedly connected to the first portion of the protective case, and is further rotatably connected to the second portion of the protective case, the second rotating shaft assembly in the hinge mechanism is fixedly connected to the second portion of the protective case, and is further rotatably connected to the third portion of the protective case, and the transmission part in the hinge mechanism cooperates with both the first rotating shaft assembly and the second rotating shaft assembly. In this way, when the second portion of the protective case rotates relative to the first portion of the protective case by using the first rotating shaft assembly, the transmission part can drive the third portion of the protective case to rotate relative to the second portion of the protective case by using the second rotating shaft assembly. That is, when the second portion of the protective case rotates relative to the first portion of the protective case, the third portion of the protective case rotates relative to the second portion of the protective case in synchronization, to implement adjustments of different angles. Therefore, the hinge mechanism can implement an adjustment of a random support angle of the electronic device, so that a use requirement of a user in more application scenarios can be met, thereby improving use performance of the electronic device.

In a possible implementation, a wireless keyboard is further included; and the wireless keyboard is located on the first portion. The wireless keyboard is disposed on the first portion of the protective case for the electronic device, so that the electronic device and the wireless keyboard may be wirelessly connected by using a radio signal, to transmit an input from the wireless keyboard to the electronic device.

According to a third aspect, an embodiment of this application provides an electronic device assembly, including: an electronic device and the protective case for the electronic device; and the electronic device is fixedly connected to a third portion of the protective case for the electronic device.

According to the electronic device assembly provided in this embodiment of this application, the electronic device assembly includes at least the protective case for the electronic device, and the protective case for the electronic device includes at least a hinge mechanism. In the hinge mechanism, a first rotating shaft assembly is fixedly connected to a first portion of the protective case, and is further rotatably connected to a second portion of the protective case, a second rotating shaft assembly in the hinge mechanism is fixedly connected to the second portion of the protective case, and is further rotatably connected to a third portion of the protective case, and a transmission part in the hinge mechanism cooperates with both the first rotating shaft assembly and the second rotating shaft assembly. In this way, when the second portion of the protective case rotates relative to the first portion of the protective case by using the first rotating shaft assembly, the transmission part can drive the third portion of the protective case to rotate relative to the second portion of the protective case by using the second rotating shaft assembly. That is, when the second portion of the protective case rotates relative to the first portion of the protective case, the third portion of the protective case rotates relative to the second portion of the protective case in synchronization, to implement adjustments of different angles. Therefore, the hinge mechanism can implement an adjustment of a random support angle of the electronic device, so that a use requirement of a user in more application scenarios can be met, thereby improving use performance of the electronic device.

DESCRIPTION OF REFERENCE NUMERALS

100: Hinge mechanism; 10: First rotating shaft assembly; 11: First rotating shaft;
111: First toothed structure; 112: First function portion; 113: First connecting portion;
12: First fastening assembly; 121: First fastening base; 1211: First base plate;
1212: First side plate; 1213: First groove; 122: First structural part;
123: Second clamping part; 1231: Second plate portion; 1232: Third plate portion;
1233: Second avoiding space; 13: Third structural part; 14: First fastener;
141: First protrusion portion; 15: Third fastener; 16: First friction plate;
20: Second rotating shaft assembly; 21: Second rotating shaft; 211: Second toothed structure;
2101: Second function portion; 2102: Second connecting portion; 22: Second fastening assembly;
221: Second fastening base; 2211: Second base plate; 2212: Second side plate;
2213: Second groove; 222: Second structural part; 223: First clamping part;
2231: First plate portion; 2232: First bent portion; 2233: First avoiding space;
23: Fourth structural part; 24: Second fastener; 241: Second protrusion portion;
30: Transmission part; 301: Transmission part body; 302: Third toothed structure;
40: Torsion spring; 110: Protective case body; 1101: First portion;
1102: Second portion; 1103: Third portion; 120: Wireless keyboard;
130: Stylus; 200: Protective case; 210: Electronic device; and
300: Electronic device assembly.

DETAILED DESCRIPTION OF ILLUSTRATIVE EMBODIMENTS

Terms used in implementations of this application are only used to explain specific embodiments of this application, and are not intended to limit this application. The following clearly describes implementations in embodiments of this application with reference to accompanying drawings.

Figure 1:
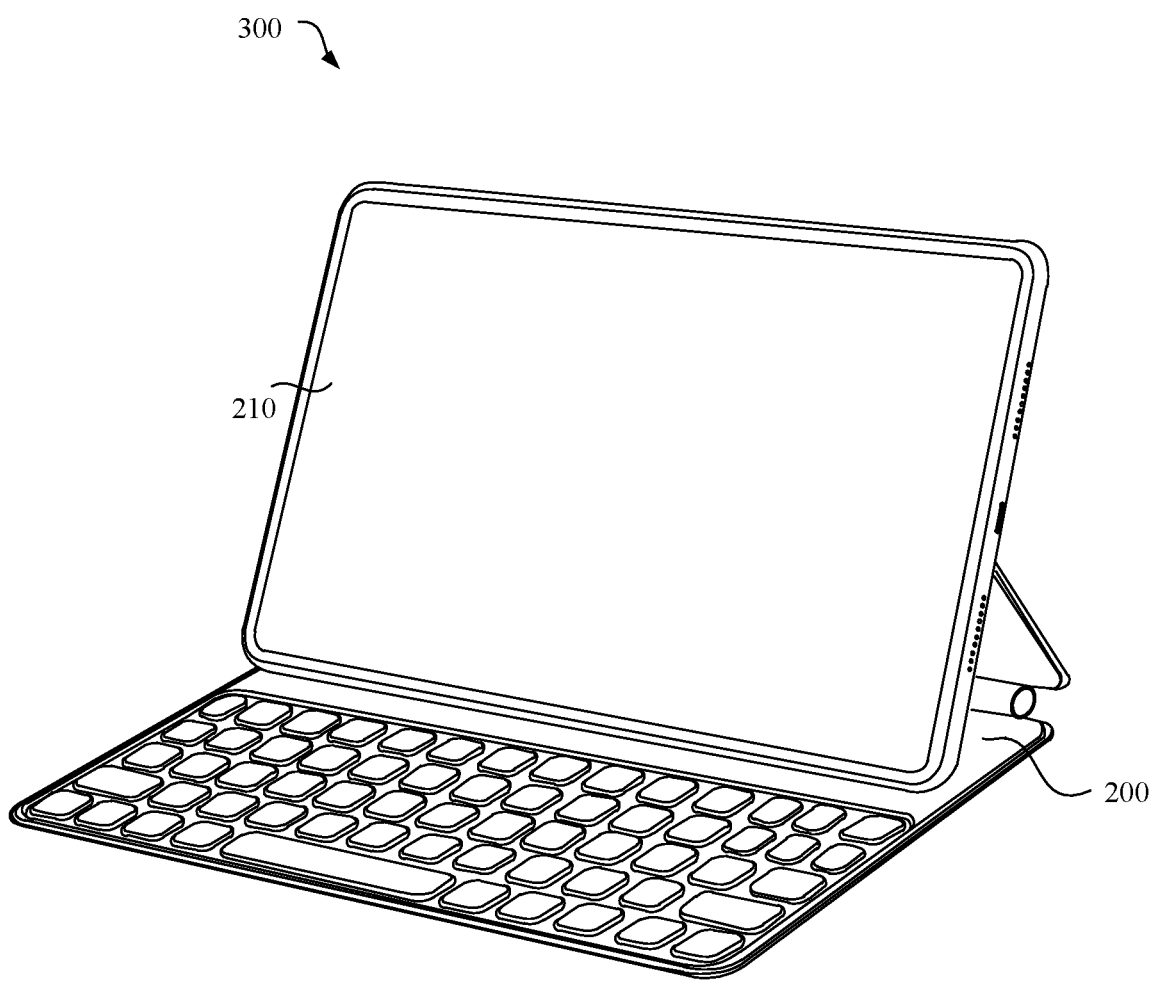
FIG. 1 is a schematic diagram of a structure of an electronic device assembly according to an embodiment of this application.

An embodiment of this application provides an electronic device assembly 300. As shown in FIG. 1, the electronic device assembly 300 may include an electronic device 210 and a protective case 200 for the electronic device 210, and the protective case 200 for the electronic device 210 is configured to protect or support the electronic device 210, where the electronic device 210 may include, but is not limited to, a mobile or fixed terminal such as a mobile phone, a tablet personal computer, a notebook computer, an ultra-mobile personal computer (ultra-mobile personal computer, UMPC), a handheld computer, a walkie-talkie, a netbook, a point of sales (Point of sales, POS), a personal digital assistant (personal digital assistant, PDA) terminal, a wearable device, a virtual reality device, a wireless USB flash drive, a Bluetooth sounder/headset, a factory-installed vehicle component, an event data recorder, a security device, or the like.

Figure 2:
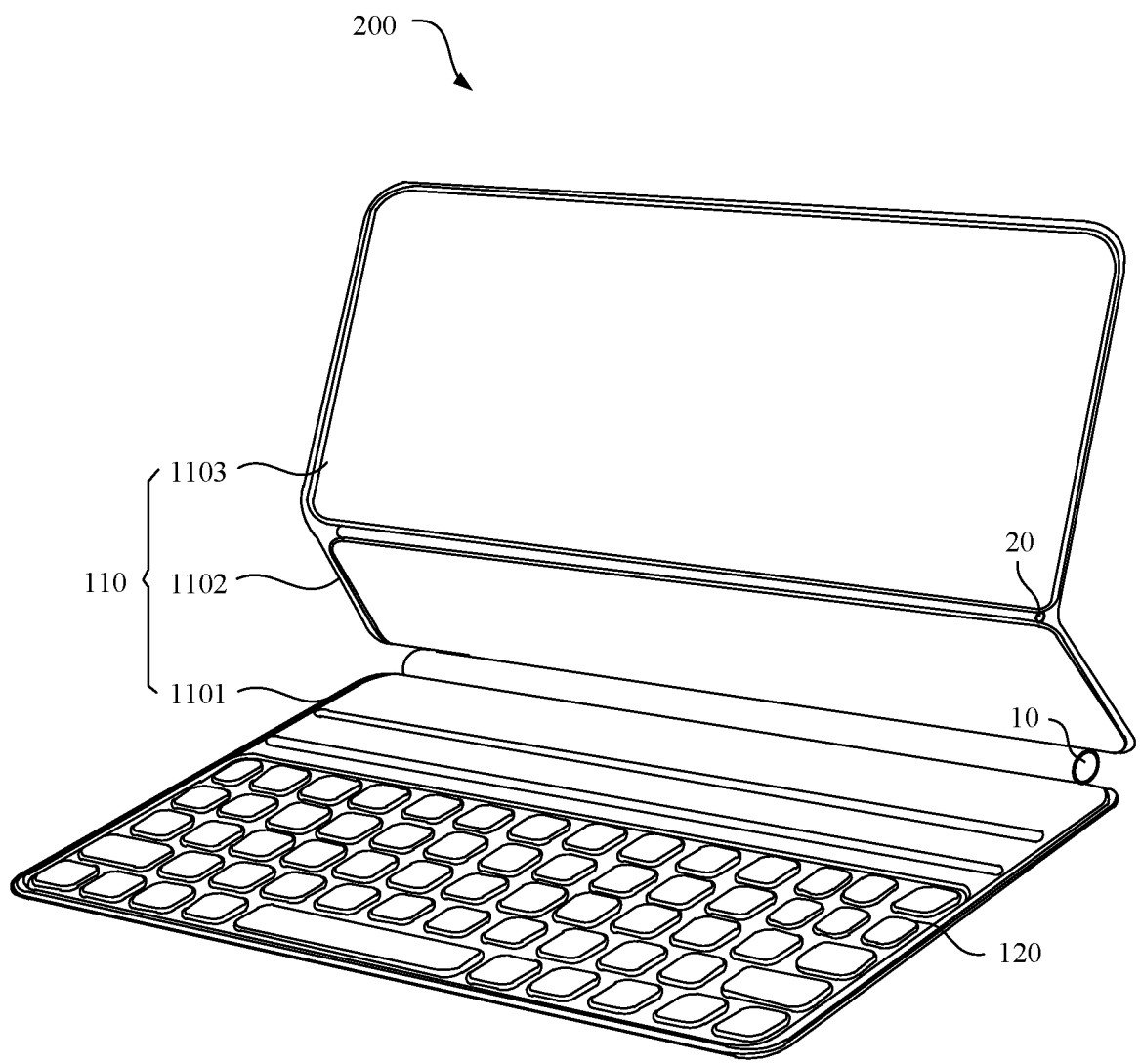
FIG. 2 is a schematic diagram of a structure of a protective case for an electronic device in an electronic device assembly according to an embodiment of this application.

The protective case 200 for the electronic device 210 may include a protective case body no and a hinge mechanism 100. As shown in FIG. 2, the protective case body no may include: a first portion 1101, a second portion 1102, and a third portion 1103; the second portion 1102 is located between the first portion 1101 and the third portion 1103; and the first portion 1101 of the protective case 200 and the second portion 1102 of the protective case 200 are connected by using the hinge mechanism 100, and the second portion 1102 of the protective case 200 and the third portion 1103 of the protective case 200 are also connected by using the hinge mechanism 100. In addition, in a possible implementation, the electronic device 210 may be fixedly connected to the third portion 1103 of the protective case 200 for the electronic device 210.

Figure 3:
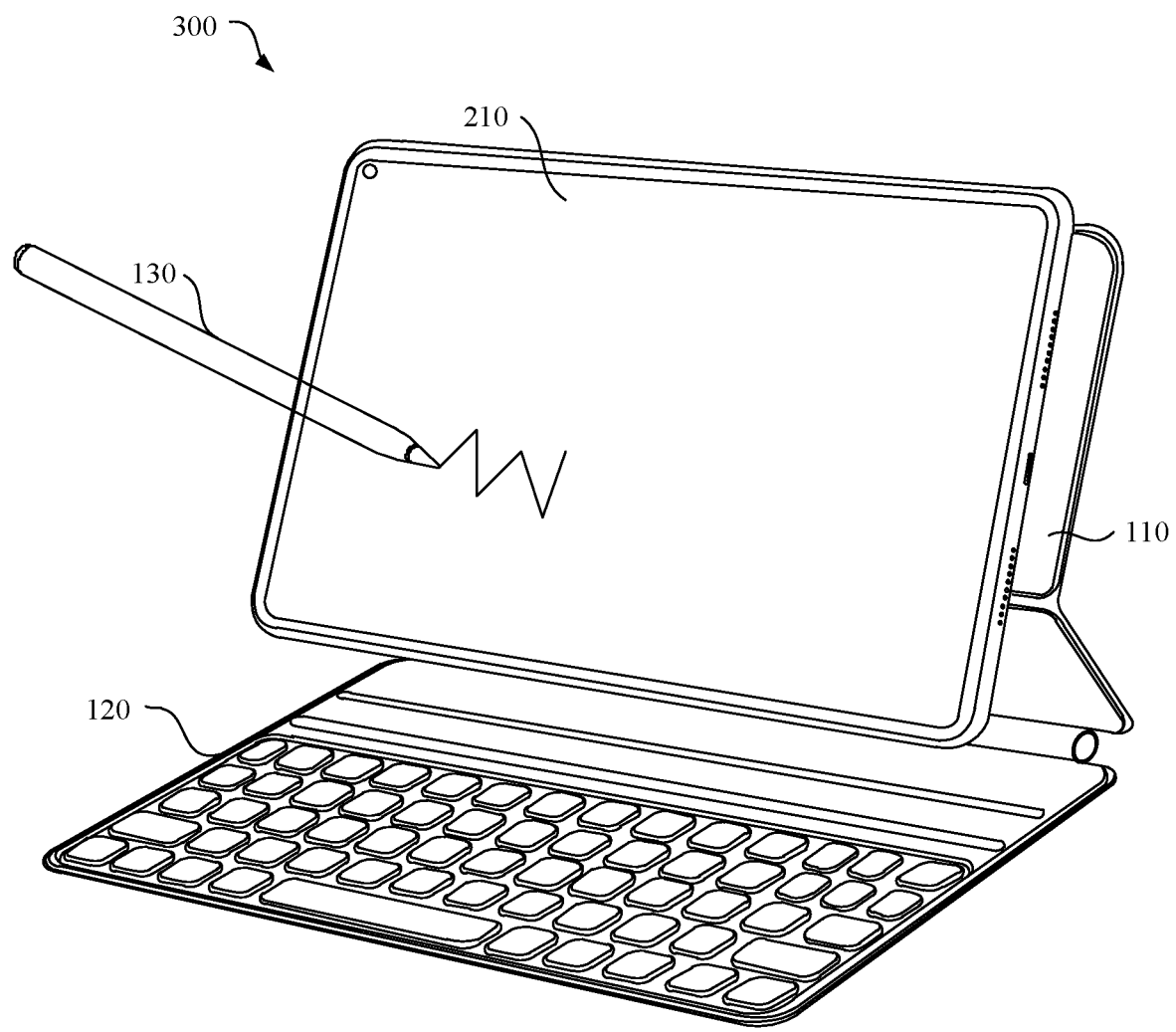
FIG. 3 is a schematic diagram of a structure of an electronic device and a protective case for the electronic device in an electronic device assembly according to an embodiment of this application.

Still referring to FIG. 3, the protective case 200 for the electronic device 210 may further include a wireless keyboard 120 and a stylus 130, and the wireless keyboard 120 may be located on the first portion 1101 of the protective case 200. The following uses an example in which a tablet computer is the electronic device 210 for description. The stylus 130 and the wireless keyboard 120 each may provide an input to electronic device 210, and the electronic device 210 performs, based on the input of the stylus 130 or the wireless keyboard 120, an operation in response to the input.

A touch region may be disposed on the wireless keyboard 120, the stylus 130 may operate the touch region of the wireless keyboard 120, to provide an input to the wireless keyboard 120, and the wireless keyboard 120 may perform, based on the input of the stylus 130, an operation in response to the input.

In an embodiment, interconnection may be implemented between the stylus 130 and the electronic device 210, between the stylus 130 and the wireless keyboard 120, and between the electronic device 210 and the wireless keyboard 120 through a communication network, to implement interaction of radio signals. The communication network may be, but is not limited to, a short-range communication network, such as a WI-FI hotspot network, a WI-FI peer-to-peer (peer-to-peer, P2P) network, a Bluetooth network, a zigbee network, or a near field communication (near field communication, NFC) network.

It may be understood that a structure shown in this embodiment of this application does not constitute a specific limitation on the protective case 200 for the tablet computer. In some other embodiments of this application, the protective case 200 for the tablet computer may include more or fewer components than those shown in the figure, or combine some components, or split some components, or have different component arrangements. The components shown in the figure may be implemented by hardware, software, or a combination of software and hardware.

In a related technology, the first portion 1101 of the protective case 200 is connected to the second portion 1102 of the protective case 200 by using soft rubber, and the second portion 1102 of the protective case 200 is connected to the third portion 1103 of the protective case 200 by using soft rubber, so that relative rotation between the first portion 1101 of the protective case 200 and the second portion 1102 of the protective case 200 and between the second portion 1102 of the protective case 200 and the third portion 1103 of the protective case 200 can be implemented. However, in this case, when the protective case 200 supports the tablet computer, only single-angle supporting can be performed, and an adjustment of a random support angle cannot be implemented, and consequently, a use requirement of a user in more application scenarios cannot be met.

Based on this, an embodiment of this application provides a hinge mechanism 100. A first rotating shaft assembly in the hinge mechanism 100 is fixedly connected to a first portion 1101 of a protective case 200, and is further rotatably connected to a second portion 1102 of the protective case 200; a second rotating shaft assembly in the hinge mechanism 100 is fixedly connected to the second portion 1102 of the protective case 200, and is further rotatably connected to a third portion 1103 of the protective case 200; and a transmission part in the hinge mechanism 100 cooperates with both the first rotating shaft assembly and the second rotating shaft assembly. In this way, when the second portion 1102 of the protective case 200 rotates relative to the first portion 1101 of the protective case 200 by using the first rotating shaft assembly, the transmission part can drive the third portion 1103 of the protective case 200 to rotate relative to the second portion 1102 of the protective case 200 by using the second rotating shaft assembly. That is, when the second portion 1102 of the protective case 200 rotates relative to the first portion 1101 of the protective case 200, the third portion 1103 of the protective case 200 rotates relative to the second portion 1102 of the protective case 200 in synchronization, to implement adjustments of different angles. Therefore, the hinge mechanism 100 can implement an adjustment of a random support angle of the electronic device 210, so that a use requirement of a user in more application scenarios can be met, thereby improving use performance of the electronic device 210.

The following uses a specific embodiment as an example, to describe a specific structure of the hinge mechanism 100 with reference to accompanying drawings.

Figure 4:
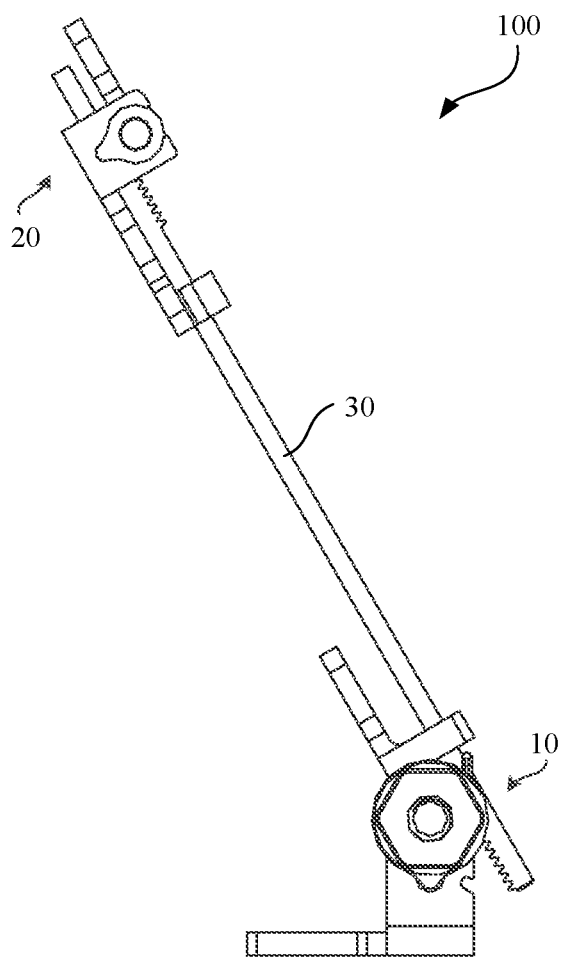
FIG. 4 is a schematic diagram of a structure of a hinge mechanism in a protective case for an electronic device according to an embodiment of this application.
Figure 5:
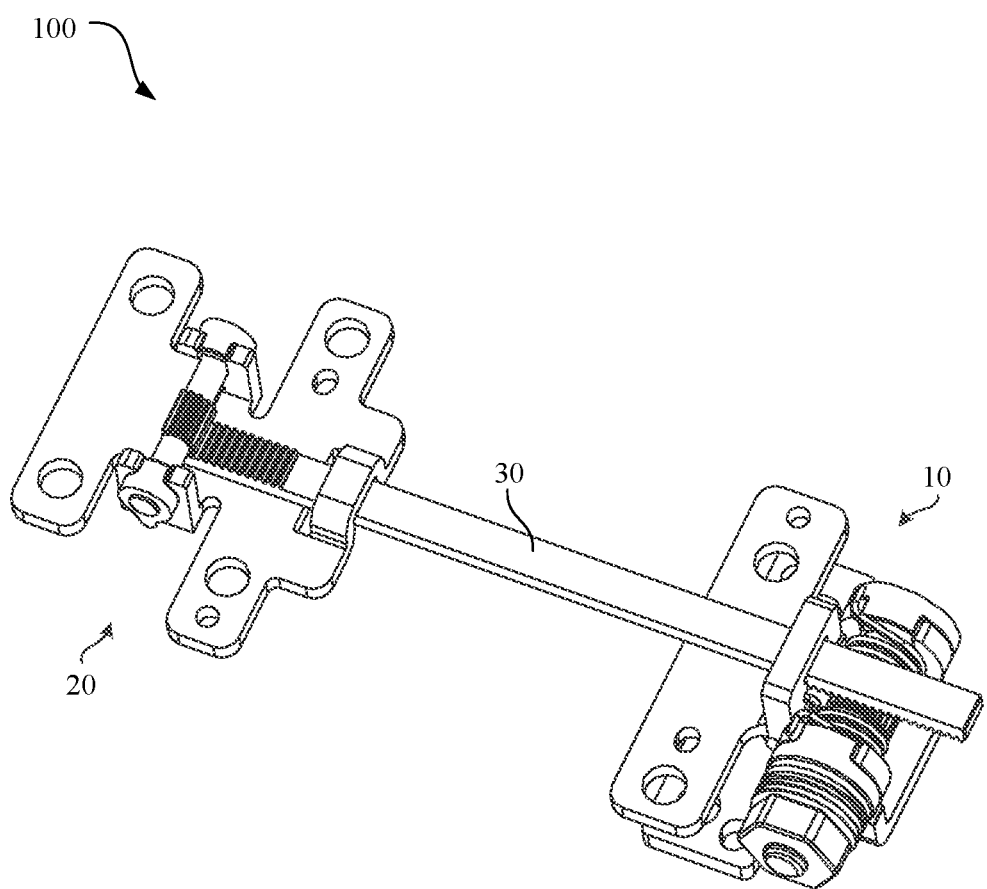
FIG. 5 is a schematic diagram of a structure of a hinge mechanism in a protective case for an electronic device according to an embodiment of this application.
Figure 6:
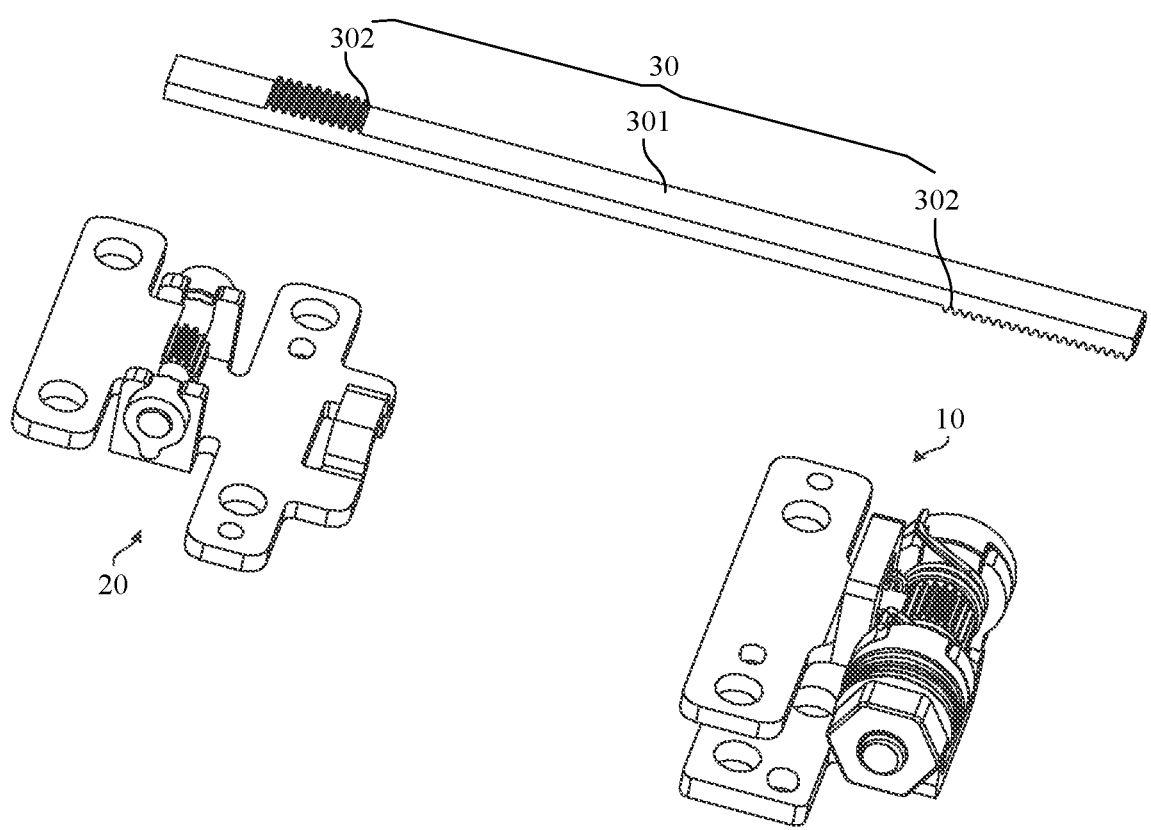
FIG. 6 is a schematic diagram of a structure of a hinge mechanism in a protective case for an electronic device according to an embodiment of this application.

As shown in FIG. 4 to FIG. 6, an embodiment of this application provides a hinge mechanism 100, and the hinge mechanism 100 is applied to a protective case 200 for an electronic device 210. The hinge mechanism 100 may include at least: a first rotating shaft assembly 10, a second rotating shaft assembly 20, and a transmission part 30 that cooperates with both the first rotating shaft assembly 10 and the second rotating shaft assembly 20. The first rotating shaft assembly 10 is fixedly connected to a first portion 1101 of the protective case 200, the first rotating shaft assembly 10 is further rotatably connected to a second portion 1102 of the protective case 200, the second rotating shaft assembly 20 is fixedly connected to a second portion 1102 of the protective case 200, and the second rotating shaft assembly 20 is further rotatably connected to a third portion 1103 of the protective case 200. When the second portion 1102 of the protective case 200 rotates relative to the first portion 1101 of the protective case 200 by using the first rotating shaft assembly 10, the transmission part 30 is configured to drive the third portion 1103 of the protective case 200 to rotate relative to the second part 1102 of the protective case 200 by using the second rotating shaft assembly 20.

The second portion 1102 of the protective case 200 is located between the first portion 1101 of the protective case 200 and the third portion 1103 of the protective case 200.

In this way, when the second portion 1102 of the protective case 200 rotates relative to the first portion 1101 of the protective case 200 by using the first rotating shaft assembly 10, the transmission part 30 can drive the third portion 1103 of the protective case 200 to rotate relative to the second portion 1102 of the protective case 200 by using the second rotating shaft assembly 20. That is, when the second portion 1102 of the protective case 200 rotates relative to the first portion 1101 of the protective case 200, the third portion 1103 of the protective case 200 rotates relative to the second portion 1102 of the protective case 200 in synchronization, to implement adjustments of different angles. Therefore, the hinge mechanism 100 can implement an adjustment of a random support angle of the electronic device 210, so that a use requirement of a user in more application scenarios can be met, thereby improving use performance of the electronic device 210.

It should be noted that, in this embodiment of this application, the first rotating shaft assembly 10 of the hinge mechanism 100 may be connected to each of the first portion 1101 of the protective case 200 and the second portion 1102 of the protective case 200, the second rotating shaft assembly 20 of the hinge mechanism 100 may be connected to each of the second portion 1102 of the protective case 200 and the third portion 1103 of the protective case 200, and the transmission part 30 of the hinge mechanism 100 may be located on the second portion 1102 of the protective case 200.

Figure 7:
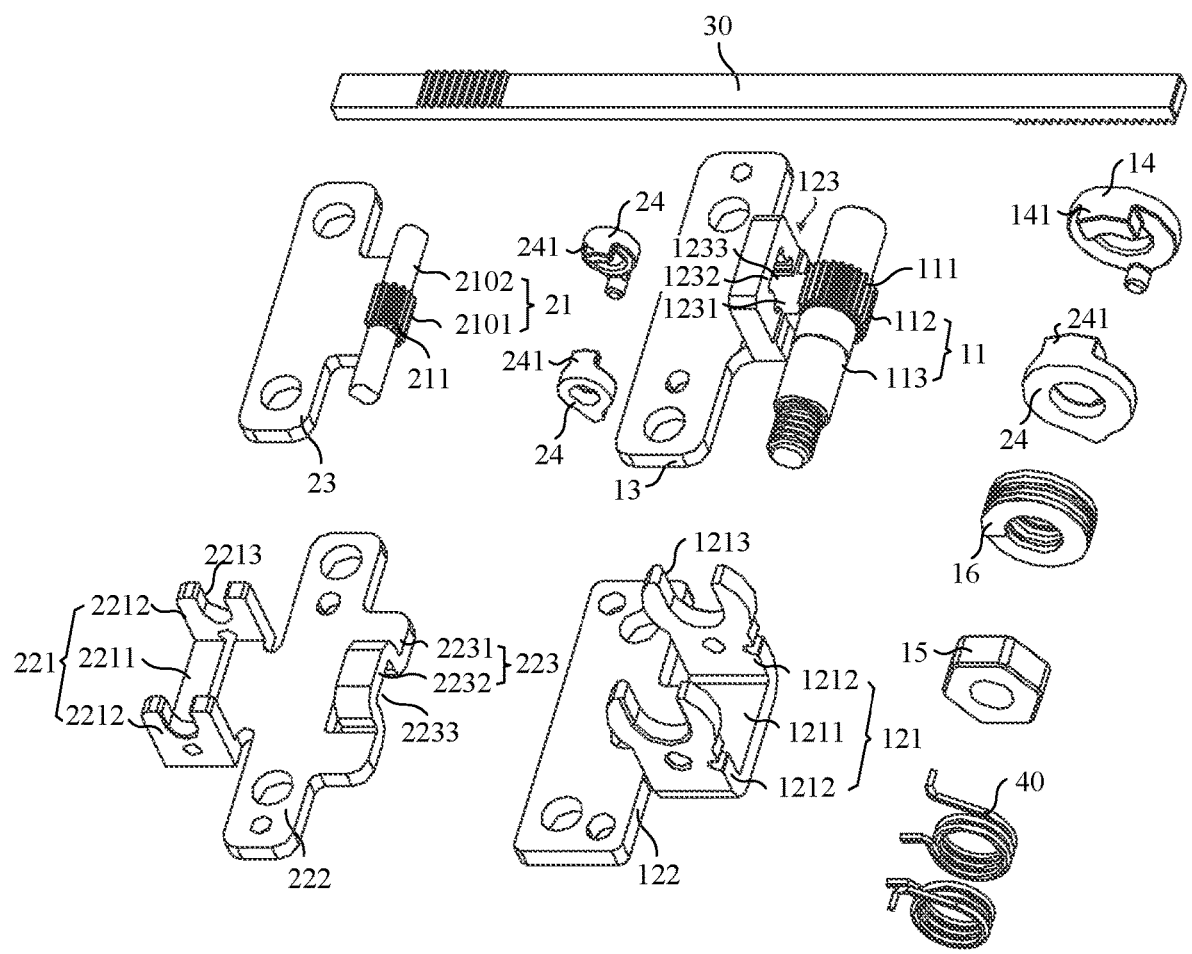
FIG. 7 is an exploded view of a hinge mechanism in a protective case for an electronic device according to an embodiment of this application.
Figure 8:
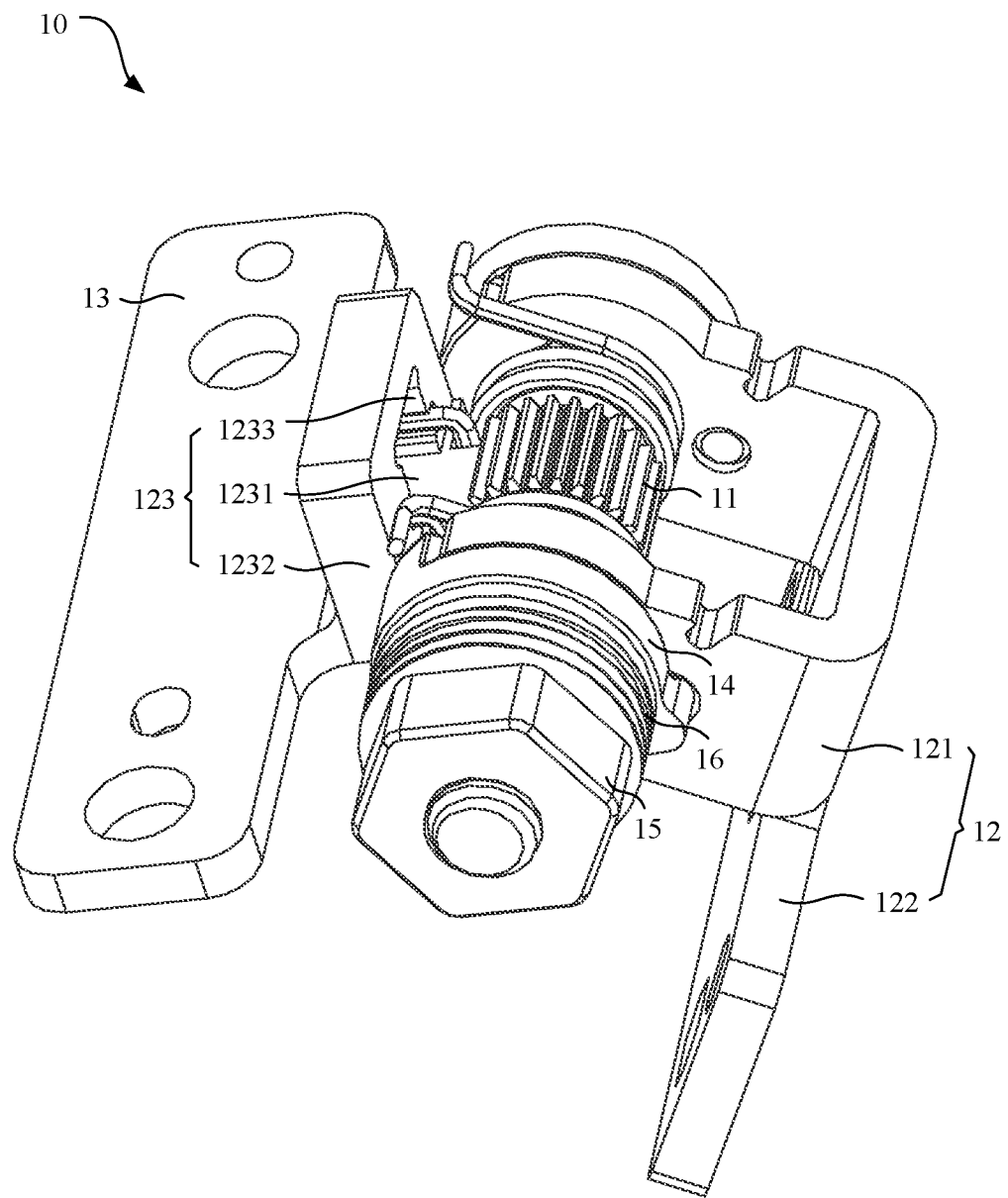
FIG. 8 is a schematic diagram of a structure of a first rotating shaft assembly in a hinge mechanism according to an embodiment of this application.
Figure 9:
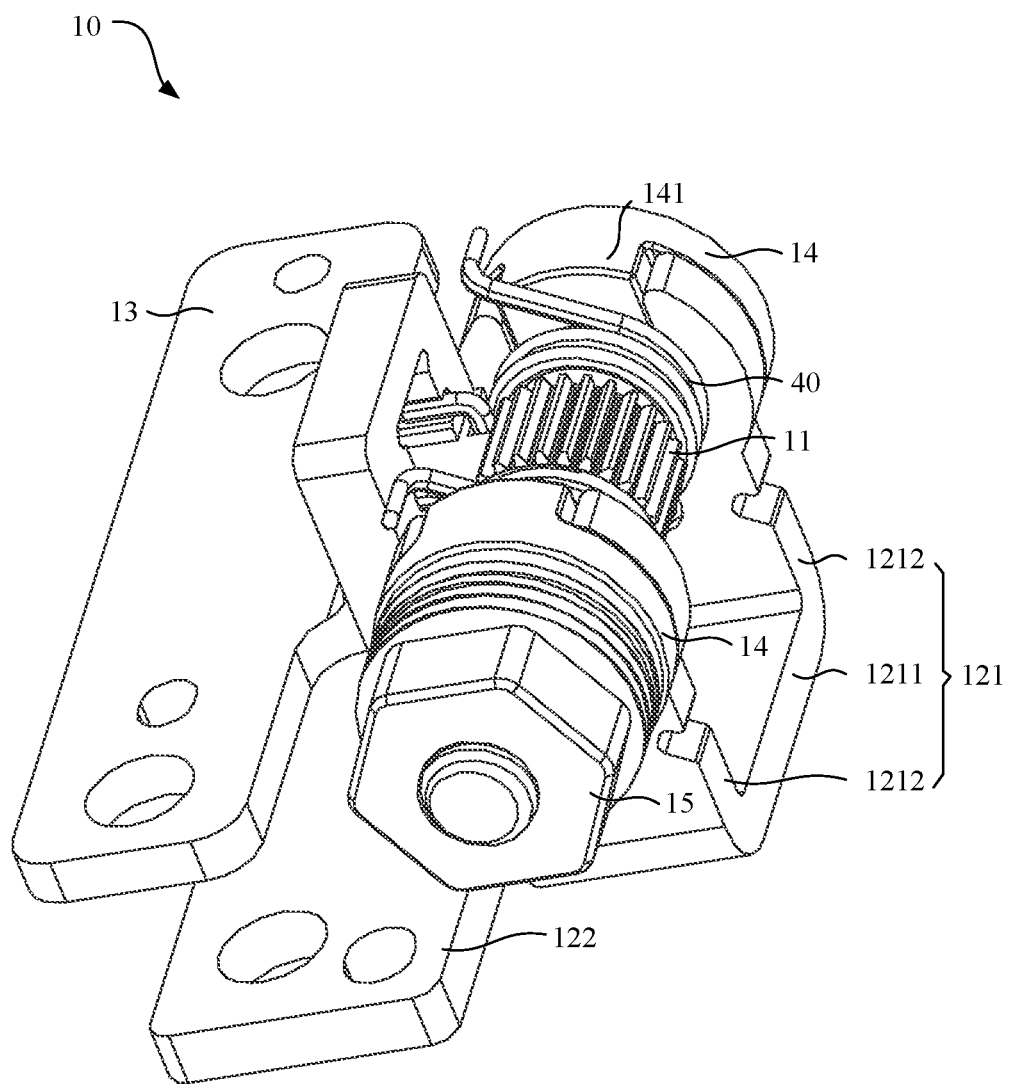
FIG. 9 is a schematic diagram of a structure of a first rotating shaft assembly in a hinge mechanism according to an embodiment of this application.

In this embodiment of this application, referring to FIG. 7 to FIG. 9, the first rotating shaft assembly 10 may include: a first rotating shaft 11 and a first fastening assembly 12 rotatably connected to the first rotating shaft 11, the first rotating shaft 11 is fixedly connected to the second portion 1102 of the protective case 200, and the first fastening assembly 12 is fixedly connected to the first portion 1101 of the protective case 200.

The first rotating shaft 11 in the first rotating shaft assembly 10 is fixedly connected to the second portion 1102 of the protective case 200, the first fastening assembly 12 in the first rotating shaft assembly 10 is fixedly connected to the first portion 1101 of the protective case 200, and the first rotating shaft 11 is rotatably connected to the first fastening assembly 12, so that the second portion 1102 of the protective case 200 rotates relative to the first portion 1101 of the protective case 200 by using the first rotating shaft assembly 10.

Figure 10:
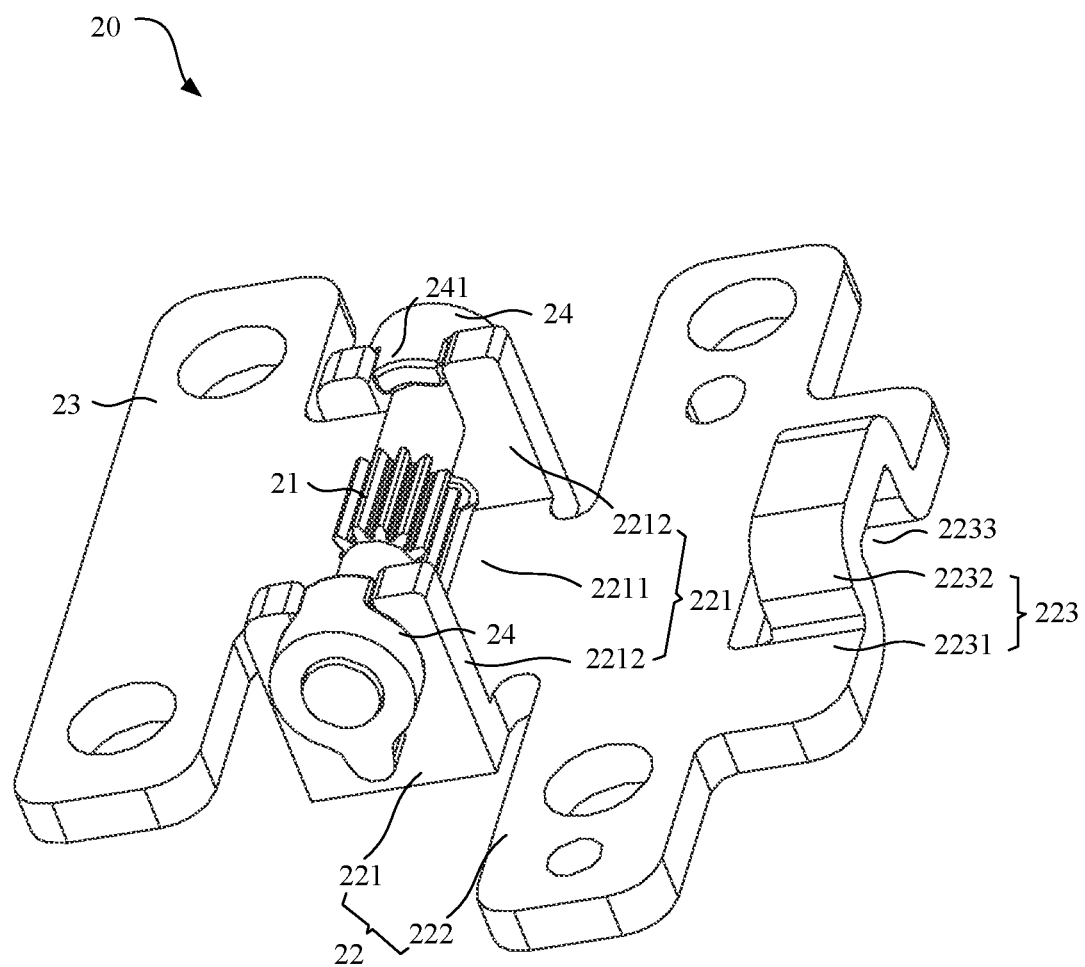
FIG. 10 is a schematic diagram of a structure of a second rotating shaft assembly in a hinge mechanism according to an embodiment of this application.

Referring to FIG. 7 and FIG. 10, the second rotating shaft assembly 20 may include: a second rotating shaft 21 and a second fastening assembly 22 rotatably connected to the second rotating shaft 21, the second rotating shaft 21 is fixedly connected to the third portion 1103 of the protective case 200, and the second fastening assembly 22 is fixedly connected to the second portion 1102 of the protective case 200.

The second rotating shaft 21 in the second rotating shaft 21 is fixedly connected to the third portion 1103 of the protective case 200, the second fastening assembly 22 in the second rotating shaft assembly 20 is fixedly connected to the second portion 1102 of the protective case 200, and the second rotating shaft 21 is rotatably connected to the second fastening assembly 22, so that the third portion 1103 of the protective case 200 rotates relative to the second portion 1102 of the protective case 200 by using the second rotating shaft assembly 20.

In this embodiment of this application, still referring to FIG. 7 and FIG. 8, the first fastening assembly 12 may include: a first fastening base 121 and a first structural part 122 fixedly connected to the first fastening base 121; and the first rotating shaft 11 is rotatably connected to the first fastening base 121, and the first structural part 122 is fixedly connected to the first portion 1101 of the protective case 200.

The first rotating shaft 11 in the first rotating shaft assembly 10 is rotatably connected to the first fastening base 121 in the first fastening assembly 12, the first structural part 122 in the first fastening assembly 12 is fixedly connected to the first portion 1101 of the protective case 200, and the first fastening base 121 is fixedly connected to the first structural part 122. In this way, the first rotating shaft 11 in the first rotating shaft assembly 10 is rotatably connected to the first fastening assembly 12, the first fastening assembly 12 is fixedly connected to the first portion 1101 of the protective case 200, so that the first rotating shaft 11 rotates relative to the first portion 1101 of the protective case 200. In addition, by disposing the first structural part 122, the first portion 1101 of the protective case 200 is fixedly connected to the first fastening base 121 by using the first structural part 122, and connection area between the first fastening base 121 and the first portion 1101 of the protective case 200 can be increased, so that stability of a connection between the first fastening base 121 and the first portion 1101 of the protective case 200 can be improved.

Still referring to FIG. 7 and FIG. 10, the second fastening assembly 22 may include: a second fastening base 221 and a second structural part 222 fixedly connected to the second fastening base 221; and the second rotating shaft 21 is rotatably connected to the second fastening base 221, and the second structural part 222 is fixedly connected to the second portion 1102 of the protective case 200.

The second rotating shaft 21 in the second rotating shaft assembly 20 is rotatably connected to the second fastening base 221 in the second fastening assembly 22, the second structural part 222 in the second fastening assembly 22 is fixedly connected to the second portion 1102 of the protective case 200, and the second fastening base 221 is fixedly connected to the second structural part 222. In this way, the second rotating shaft 21 in the second rotating shaft assembly 20 is rotatably connected to the second fastening assembly 22, and the second fastening assembly 22 is fixedly connected to the second portion 1102 of the protective case 200, so that the second rotating shaft 21 rotates relative to the second portion 1102 of the protective case 200. In addition, by disposing the second structural part 222, the second portion 1102 of the protective case 200 is fixedly connected to the second fastening base 221 by using the second structural part 222, and connection area between the second fastening base 221 and the second portion 1102 of the protective case 200 can be increased, so that stability of a connection between the second fastening base 221 and the second portion 1102 of the protective case 200 can be improved.

In this embodiment of this application, the first fastening base 121 may include: a first base plate 1211 and two first side plates 1212 that are disposed opposite to each other; and the two first side plates 1212 are both connected to the first base plate 1211, the two first side plates 1212 are located on a same side of the first base plate 1211, one end that is of each of the two first side plates 1212 and that is away from the first base plate 1211 is provided with a first groove 1213, and the first rotating shaft 11 is located in the first groove 1213.

The one end that is of each of the two first side plates 1212 of the first fastening base 121 and that is away from the first base plate 1211 is provided with the first groove 1213, and the first rotating shaft 11 is located in the first groove 1213. In this way, the first rotating shaft 11 can freely rotate along an inner wall of the first groove 1213, so that the first rotating shaft 11 is rotatably connected to the first fastening base 121.

The second fastening base 221 may include: a second base plate 2211 and two second side plates 2212 that are disposed opposite to each other; and the two second side plates 2212 are both connected to the second base plate 2211, the two second side plates 2212 are located on a same side of the second base plate 2211, one end that is of each of the two second side plates 2212 and that is away from the second base plate 2211 is provided with a second groove 2213, and the second rotating shaft 21 is located in the second groove 2213.

The one end that is of each of the two second side plates 2212 of the second fastening base 221 and that is away from the second base plate 2211 is provided with the second groove 2213, and the second rotating shaft 21 is located in the second groove 2213. In this way, the second rotating shaft 21 can freely rotate along an inner wall of the second groove 2213, so that the second rotating shaft 21 is rotatably connected to the second fastening base 221.

In this embodiment of this application, the second fastening assembly 22 may further include a first clamping part 223; and the first clamping part 223 is connected to one end that is of the second structural part 222 and that is away from the second fastening base 221. The first clamping part 223 is configured to limit a movement range of the transmission part 30, to avoid slipping of the transmission part 30, or avoid a problem that a moving direction of the transmission part 30 does not match a moving direction of each of the first rotating shaft 11 and the second rotating shaft 21.

In this embodiment of this application, the first clamping part 223 may include: a first plate portion 2231 and a first bent portion 2232 connected to the first plate portion 2231; and the first plate portion 2231 is connected to the second structural part 222, the first plate portion 2231 and the second structural part 222 are located on a same plane, and a first avoiding space 2233 for the transmission part 30 to pass through is formed between the first bent portion 2232 and the first plate portion 2231.

The first plate portion 2231 of the first clamping part 223 is connected to the second structural part 222, the first plate portion 2231 and the second structural part 222 are located on a same plane, the first bent portion 2232 of the first clamping part 223 is connected to the first plate portion 2231, and the first avoiding space 2233 for the transmission part 30 to pass through is formed between the first bent portion 2232 and the first plate portion 2231. In this way, the transmission part 30 passes through the first avoiding space 2233 formed between the first bent portion 2232 and the first plate portion 2231, and the first avoiding space 2233 can limit a movement range of the transmission part 30, to avoid slipping of the transmission part 30, or avoid a problem that a moving direction of the transmission part 30 does not match a moving direction of each of the first rotating shaft 11 and the second rotating shaft 21.

In this embodiment of this application, the first rotating shaft assembly 10 may further include a third structural part 13, the third structural part 13 is fixedly connected to the first rotating shaft 11, and the third structural part 13 is further fixedly connected to the second portion 1102 of the protective case 200.

By disposing the third structural part 13, the third structural part 13 is fixedly connected to the first rotating shaft 11, and the third structural part 13 is fixedly connected to the second portion 1102 of the protective case 200, so that the first rotating shaft 11 is fixedly connected to the second portion 1102 of the protective case 200 by using the third structural part 13, and connection area between the first rotating shaft 11 and the second portion 1102 of the protective case 200 can be increased, thereby improving stability of a connection between the first rotating shaft 11 and the second portion 1102 of the protective case 200.

The second rotating shaft assembly 20 may further include a fourth structural part 23; and the fourth structural part 23 is fixedly connected to the second rotating shaft 21, and the fourth structural part 23 is fixedly connected to the third portion 1103 of the protective case 200.

By disposing the fourth structural part 23, the fourth structural part 23 is fixedly connected to the second rotating shaft 21, and the fourth structural part 23 is fixedly connected to the third portion 1103 of the protective case 200, so that the second rotating shaft 21 is fixedly connected to the third portion 1103 of the protective case 200 by using the fourth structural part 23, and connection area between the second rotating shaft 21 and the third portion 1103 of the protective case 200 can be increased, thereby improving stability of a connection between the second rotating shaft 21 and the third portion 1103 of the protective case 200.

In this embodiment of this application, the first rotating shaft assembly 10 may further include a second clamping part 123; and one end of the second clamping part 123 is connected to the third structural part 13, and the other end of the second clamping part 123 is connected to the first rotating shaft 11. The second clamping part 123 is further configured to limit the movement range of the transmission part 30, to avoid slipping of the transmission part 30, or avoid the problem that the moving direction of the transmission part 30 does not match the moving direction of each of the first rotating shaft 11 and the second rotating shaft 21.

In this embodiment of this application, the second clamping part 123 may include: a second plate portion 1231 and a third plate portion 1232 vertically connected to the second plate portion 1231; and the second plate portion 1231 is connected to each of the third structural part 13 and the first rotating shaft 11, the second plate portion 1231 and the third structural part 13 are located on a same plane, and a second avoiding space 1233 for the transmission part 30 to pass through is formed on the third plate portion 1232.

The second plate portion 1231 of the second clamping part 123 is connected to each of the third structural part 13 and the first rotating shaft 11, the second plate portion 1231 and the third structural part 13 are located on a same plane, the third plate portion 1232 of the second clamping part 123 is vertically connected to the second plate portion 1231, and the second avoiding space 1233 for the transmission part 30 to pass through is formed on the third plate portion 1232. In this way, the transmission part 300 passes through the second avoiding space 1233 formed on the third plate portion 1232, and the second avoiding space 1233 can limit the movement range of the transmission part 30, to avoid slipping of the transmission part 30, or avoid the problem that the moving direction of the transmission part 30 does not match the moving direction of each of the first rotating shaft 11 and the second rotating shaft 21.

In this embodiment of this application, one end of the transmission part 30 passes through the second avoiding space 1233 and cooperates with the first rotating shaft 11, and the other end of the transmission part 30 passes through the first avoiding space 2233 and cooperates with the second rotating shaft 21. In this way, the transmission part 30 cooperates with the first rotating shaft 11 and the second rotating shaft 21, and the movement range of the transmission part 30 can be limited to some extent, to avoid slipping of the transmission part 30, or avoid the problem that the moving direction of the transmission part 30 does not match the moving direction of each of the first rotating shaft 11 and the second rotating shaft 21.

In this embodiment of this application, the transmission part 30 may be a gear rack. The gear rack is a special gear whose teeth are distributed on a strip. The gear rack falls into two types: a straight-toothed gear rack and a helical-toothed gear rack. The straight-toothed gear rack and the helical-toothed gear rack are respectively paired with a straight-toothed cylindrical gear and a helical-toothed cylindrical gear for use. A tooth profile of the gear rack is a straight line rather than an involute (a plane for a tooth surface), and the gear rack is equivalent to a cylindrical gear with infinite radius of a divided circle.

In this embodiment of this application, at least a part of an outer periphery of the first rotating shaft 11 may be provided with a first toothed structure in, and the first toothed structure in is engaged with at least a part of the gear rack. The at least a part of the outer periphery of the first rotating shaft 11 is provided with the first toothed structure in, to form a first gear, and the first gear is engaged with the at least a part of the gear rack, so that the first rotating shaft 11 cooperates with the gear rack serving as the transmission part 30.

At least a part of an outer periphery of the second rotating shaft 21 may be provided with a second toothed structure 211, and the second toothed structure 211 is engaged with at least a part of the gear rack. The at least a part of the outer periphery of the second rotating shaft 21 is provided with the second toothed structure 211, to form a second gear, and the second gear is engaged with the at least a part of the gear rack, so that the second rotating shaft 21 cooperates with the gear rack serving as the transmission part 30.

Specifically, as shown in FIG. 6, the transmission part 302 may include: a transmission part body 301 and a third toothed structure 302 disposed on the transmission part body 301, where the third toothed structure 302 may be disposed on the entire transmission part body 301, or a plurality of discontinuous third toothed structures 30 may be disposed on the transmission part body 301.

For example, the transmission part body 301 is provided with two third toothed structures 302 (as shown in FIG. 6), and the two third toothed structures 302 are discontinuous and located at two ends of the transmission part body 301, so that the third toothed structure 302 located at one end of the transmission part body 301 may be engaged with the first toothed structure 111 on the outer periphery of the first rotating shaft 11, and the third toothed structure 302 located at the other end of the transmission part body 301 may be engaged with the second toothed structure 211 on the outer periphery of the second rotating shaft 21.

In this embodiment of this application, the first rotating shaft 11 may include: a first function portion 112 and a first connecting portion 113 connected to the first function portion 112; and at least a part of an outer periphery of the first function portion 112 is provided with the first toothed structure in, and the first toothed structure 111 is engaged with the at least a part of the gear rack.

The second rotating shaft 21 may include: a second function portion 2101 and a second connecting portion 2102 connected to the second function portion 2101; and at least a part of an outer periphery of the second function portion 2101 is provided with the second toothed structure 211, and the second toothed structure 211 is engaged with the at least a portion of the gear rack.

In this embodiment of this application, at least one torsion spring 40 may be included; and the torsion spring 40 is sleeved onto the first connecting portion 113, one end of the torsion spring 40 abuts on the first side plate 1212, and the other end of the torsion spring 40 abuts on the second clamping part 123.

By disposing the at least one torsion spring 40, the torsion spring 40 is sleeved onto the first connecting portion 113 of the first rotating shaft 11, one end of the torsion spring 40 abuts on the first side plate 1212 of the first fastening base 121, and the other end of the torsion spring 40 abuts on the second clamping part 123, so that the torsion spring 40 can provide torsion energy storage. For example, a torsion force of the torsion spring 40 may be designed to have a torque equal to the weight of the electronic device 210.

In some embodiments, when an included angle between the first portion 1011 of the protective case 200 and the second portion 1012 of the protective case 200 is 90 degrees, the torsion force of the torsion spring 40 may be designed to be zero, so that when the included angle between the first portion 1011 of the protective case 200 and the second portion 1012 of the protective case 200 is greater than 90 degrees or less than 90 degrees, the torsion spring 40 may provide torsion energy storage, for example, the torsion force of the torsion spring 40 may be designed to have a torque equal to the weight of the electronic device 210.

In addition, it may be understood that in an initial state, the tablet computer is parallel to the first portion 1101 of the protective case 200, that is, the third portion 1103 of the protective case 200 and the second portion 1102 of the protective case 200 each are at an included angle of zero degrees from the first portion 1101 of the protective case 200, and the second rotating shaft 21 in the second rotating shaft assembly 20 does not cooperate with the transmission part 30 until an included angle between the tablet computer and the first portion 1101 of the protective case 200 is 60 degrees, that is, the included angle between the third portion 1103 of the protective case 200 and the first portion 1101 of the protective case 200 is 60 degrees. After the included angle between the tablet computer and the first portion 1101 of the protective case 200 is 60 degrees, that is, the included angle between the third portion 1103 of the protective case 200 and the first portion 1101 of the protective case 200 is 60 degrees, the second rotating shaft 21 in the second rotating shaft assembly 20 cooperates with the transmission part 30, to drive the tablet computer to rotate.

Specifically, for example, the included angle between the second portion 1102 of the protective case 200 and the first portion 1101 of the protective case 200 is $\alpha$, the included angle between the third portion 1103 of the protective case 200 and the first portion 1101 of the protective case 200 is $\theta$, a distance from the second rotating shaft 21 to a bottom end of the tablet computer is L1, and a distance from the first rotating shaft 11 to the second rotating shaft 21 is L2.

The angle $\alpha$ when the second portion 1102 of the protective case 200 starts to rotate depends on an actual length of L1 and an actual length of L2, where $\alpha=\arcsin(L1/L2)$. A magnitude of a rotational angle of the third portion 1103 of the protective case 200 depends on a rotational speed ratio n of the first rotating shaft 11 to the second rotating shaft 21, for example, the rotational speed ratio n of the first rotating shaft 11 to the second rotating shaft 21 may be designed as 2:1, 2.5:1, 3:4 or the like, so that when the first rotating shaft 11 rotates $\alpha+\beta$ degrees, the rotational angle of the third portion 1103 of the protective case 200 is $n\times\beta$ degrees, and an included angle between the tablet computer and a horizontal plane is $\theta=180°-(\alpha+\beta+n\beta)$.

In this embodiment of this application, the first rotating shaft assembly 10 may further include at least one first fastener 14; and the first fastener 14 is sleeved onto the first connecting portion 113, a first protrusion portion 141 may be disposed on the first fastener 14, the first protrusion portion 141 cooperates with the first groove 1213, to limit the first rotating shaft 11 in an annular space surrounded by the first protrusion portion 141 and the first groove 1213.

The at least one first fastener 14 is sleeved onto the first connecting portion 113 of the first rotating shaft 11, the first fastener 14 includes the first protrusion portion 141, and the first protrusion portion 141 cooperates with the first groove 1213 provided on the first fastening base 121, so that the first rotating shaft 11 is located in the first groove 1213, and the annular space surrounded by the first protrusion portion 141 and the first groove 1213 can be used to limit the first rotating shaft 11, so as to ensure that the first rotating shaft 11 can freely rotate along the inner wall of the first groove 1213, and avoid a problem that the first rotating shaft 11 falls off from the first groove 1213. In addition, the first fastener 14 can further limit a cooperation region of the transmission part 30 on the first rotating shaft 11, to ensure that the transmission part 30 cooperates with the first function portion 112 of the first rotating shaft 11.

The second rotating shaft assembly 20 may further include at least one second fastener 24; and the second fastener 24 is sleeved onto the second connecting portion 2102, a second protrusion portion 241 may be disposed on the second fastener 24, the second protrusion portion 241 cooperates with the second groove 2213, to limit the second rotating shaft 21 in an annular space 25 surrounded by the second protrusion portion 241 and the second groove 2213.

The at least one second fastener 24 is sleeved onto the second connecting portion 2102 of the second rotating shaft 21, the second fastener 24 includes the second protrusion portion 241, and the second protrusion portion 241 cooperates with the second groove 2213 provided on the second fastening base 221, so that the second rotating shaft 21 is located in the second groove 2213, and the annular space 25 surrounded by the second protrusion portion 241 and the second groove 2213 can be used to limit the second rotating shaft 21, so as to ensure that the second rotating shaft 21 can freely rotate along the inner wall of the second groove 2213, and avoid a problem that the second rotating shaft 21 falls off from the second groove 2213. In addition, the second fastener 24 can further limit a cooperation region of the transmission part 30 on the second rotating shaft 21, to ensure that the transmission part 30 cooperates with the second function portion 2101 of the second rotating shaft 21.

In this embodiment of this application, the first rotating shaft assembly 10 may further include at least one third fastener 15; and the third fastener 15 is sleeved onto the first connecting portion 113, and the third fastener 15 is located on a side that is of the first fastener 14 and that is away from the side plate.

The at least one third fastener 15 is sleeved onto the first connecting portion 113 of the first rotating shaft 11, and the third fastener 15 is located on the side that is of the first fastener 14 and that is away from the side plate of the first fastening base 121, so that the third fastener 15 can further limit the cooperation region of the transmission part 30 on the first rotating shaft 11, to ensure that the transmission part 30 cooperates with the first function portion 112 of the first rotating shaft 11.

In this embodiment of this application, at least one first friction plate 16 may be disposed between the first fastener 14 and the third fastener 15. The first friction plate can provide a specific friction force, to more firmly fasten the first fastener 14 and the third fastener 15 to the first connecting portion 113 of the first rotating shaft 11.

The second rotating shaft assembly 20 may further include at least one fourth fastener (not shown in the figure); and the fourth fastener may be sleeved onto the second connecting portion 2102, and the fourth fastener is located on a side that is of the second fastener 24 and that is away from the side plate.

The at least one fourth fastener is sleeved onto the second connecting portion 2102 of the second rotating shaft 21, and the fourth fastener is located on the side that is of the second fastener 24 and that is away from the side plate of the second fastening base 221, so that the fourth fastener can further limit the cooperation region of the transmission part 30 on the second rotating shaft 21, to ensure that the transmission part 30 cooperates with the second function portion 2101 of the second rotating shaft 21.

Similarly, at least one second friction plate (not shown in the figure) may be disposed between the second fastener 24 and the fourth fastener. The second friction plate can provide a specific friction force, to more firmly fasten the second fastener 24 and the fourth fastener to the second connecting portion 2102 of the second rotating shaft 21.

In the descriptions of embodiments of this application, it should be noted that unless otherwise specified and defined explicitly, the terms "mount", "connected to" and "connect" should be understood in a broad sense, and for example, may be a fixed connection or an indirect connection by using an intermediate medium, or may be internal communication between two elements or an interaction relationship of two elements. A person of ordinary skill in the art can understand specific meanings of these terms in embodiments of this application based on specific situations.

The device or element referred to in or implied in embodiments needs to have a specific orientation, be constructed and operated in a specific orientation, and therefore cannot be construed as a limitation on the embodiments. In the descriptions of embodiments of this application, "a plurality of" means two or more, unless otherwise specifically defined.

In the specification of embodiments, claims, and accompanying drawings of this application, the terms "first", "second", "third", "fourth", and the like (if existent) are intended to distinguish between similar objects but do not necessarily indicate a specific order or sequence. It should be understood that the data termed in such a way is interchangeable in proper circumstances, so that embodiments described herein can be implemented in orders except the order illustrated or described herein. In addition, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

Finally, it should be noted that the foregoing embodiments are only used to illustrate the technical solutions of embodiments of this application, but are not used to limit this application. Although embodiments of this application has been described in detail with reference to the foregoing embodiments, it should be understood by a person of ordinary skill in the art that the technical solutions described in the foregoing embodiments may still be modified, or some or all technical features thereof are equivalently replaced. These modifications or replacements do not make the essence of the corresponding technical solutions depart from the scope of the technical solutions of embodiments of this application.

What is claimed is:

1. A hinge mechanism, applied to a protective case for an electronic device and comprising at least:
   a first rotating shaft assembly, a second rotating shaft assembly, and a transmission part that cooperates with both the first rotating shaft assembly and the second rotating shaft assembly, wherein
   the first rotating shaft assembly is fixedly connected to a first portion of the protective case, and the first rotating shaft assembly is further rotatably connected to a second portion of the protective case;
   the second rotating shaft assembly is fixedly connected to the second portion of the protective case, and the second rotating shaft assembly is further rotatably connected to a third portion of the protective case;
   when the second portion of the protective case rotates relative to the first portion of the protective case by using the first rotating shaft assembly, the transmission part drives the third portion of the protective case to rotate relative to the second portion of the protective case by using the second rotating shaft assembly;
   the second portion of the protective case is located between the first portion of the protective case and the third portion of the protective case;
   the first rotating shaft assembly comprises: a first rotating shaft and a first fastening assembly rotatably connected to the first rotating shaft;
   the first rotating shaft is fixedly connected to the second portion of the protective case, and the first fastening assembly is fixedly connected to the first portion of the protective case;
   the second rotating shaft assembly comprises: a second rotating shaft and a second fastening assembly rotatably connected to the second rotating shaft; and the second rotating shaft is fixedly connected to the third portion of the protective case, and the second fastening assembly is fixedly connected to the second portion of the protective case.

2. The hinge mechanism according to claim 1, wherein the first fastening assembly comprises: a first fastening base and a first structural part fixedly connected to the first fastening base;
the first rotating shaft is rotatably connected to the first fastening base, and the first structural part is fixedly connected to the first portion of the protective case;
the second fastening assembly comprises: a second fastening base and a second structural part fixedly connected to the second fastening base; and
the second rotating shaft is rotatably connected to the second fastening base, and the second structural part is fixedly connected to the second portion of the protective case.

3. The hinge mechanism according to claim 2, wherein the first fastening base comprises: a first base plate and two first side plates that are disposed opposite to each other; the two first side plates are both connected to the first base plate, and the two first side plates are located on a same side of the first base plate;
one end that is of each of the two first side plates and that is farthest away from the first base plate is provided with a first groove, and the first rotating shaft is located in the first groove;
the second fastening base comprises: a second base plate and two second side plates that are disposed opposite to each other; the two second side plates are both connected to the second base plate, and the two second side plates are located on a same side of the second base plate; and
one end that is of each of the two second side plates and that is farthest away from the second base plate is provided with a second groove, and the second rotating shaft is located in the second groove.

4. The hinge mechanism according to claim 3, wherein the second fastening assembly further comprises a first clamp; and the first clamp is connected to one end that is of the second structural part and that is farthest away from the second fastening base.

5. The hinge mechanism according to claim 4, wherein the first clamp comprises: a first plate and a first bent portion connected to the first plate;
the first plate is connected to the second structural part, and the first plate and the second structural part are located on a same plane; and
a first space that allows the transmission part to pass through is between the first bent portion and the first plate.

6. The hinge mechanism according to claim 5, wherein the first rotating shaft assembly further comprises a third structural part; the third structural part is fixedly connected to the first rotating shaft, and the third structural part is further fixedly connected to the second portion of the protective case; and
the second rotating shaft assembly further comprises a fourth structural part; and the fourth structural part is fixedly connected to the second rotating shaft, and the fourth structural part is further fixedly connected to the third portion of the protective case.

7. The hinge mechanism according to claim 6, wherein the first rotating shaft assembly further comprises a second clamp; and one end of the second clamp is connected to the third structural part, and the other end of the second clamp is connected to the first rotating shaft.

8. The hinge mechanism according to claim 7, wherein the second clamp comprises: a second plate and a third plate vertically connected to the second plate;
the second plate is connected to each of the third structural part and the first rotating shaft, and the second plate and the third structural part are located on a same plane; and
a second space that allows the transmission part to pass through is on the third plate.

9. The hinge mechanism according to claim 8, wherein one end of the transmission part passes through the second space and cooperates with the first rotating shaft, and the other end of the transmission part passes through the first space and cooperates with the second rotating shaft.

10. The hinge mechanism according to claim 9, wherein the transmission part is a gear rack.

11. The hinge mechanism according to claim 10, wherein at least a part of an outer periphery of the first rotating shaft is provided with a first toothed structure, and the first toothed structure is engaged with at least a part of the gear rack; and
at least a part of an outer periphery of the second rotating shaft is provided with a second toothed structure, and the second toothed structure is engaged with at least a part of the gear rack.

12. The hinge mechanism according to claim 11, wherein the first rotating shaft comprises: a first function portion and a first connecting portion connected to the first function portion;
at least a part of an outer periphery of the first function portion is provided with the first toothed structure, and the first toothed structure is engaged with at least a part of the gear rack;
the second rotating shaft comprises: a second function part and a second connecting part connected to the second function part; and
at least a part of an outer periphery of the second function portion part is provided with the second toothed structure, and the second toothed structure is engaged with at least a part of the gear rack.

13. The hinge mechanism according to claim 12, further comprising at least one torsion spring, wherein the at least one torsion spring is sleeved onto the first connecting portion, one end of the at least one torsion spring abuts on at least one of the first side plates, and the other end of the torsion spring abuts on the second clamp.

14. The hinge mechanism according to claim 13, wherein the first rotating shaft assembly further comprises at least one first fastener; the at least one first fastener is sleeved onto the first connecting portion;
a first protrusion portion is disposed on the at least one first fastener, the first protrusion portion cooperates with the first groove, to limit the first rotating shaft in an annular space surrounded by the first protrusion portion and the first groove;
the second rotating shaft assembly further comprises at least one second fastener; the at least one second fastener is sleeved onto the second connecting part; and
a second protrusion portion is disposed on the at least one second fastener, and the second protrusion portion cooperates with the second groove, to limit the second rotating shaft in an annular space surrounded by the second protrusion portion and the second groove.

15. The hinge mechanism according to claim 14, wherein the first rotating shaft assembly further comprises at least one third fastener; the at least one third fastener is sleeved onto the first connecting portion, and the at least one third fastener is located on a side that is of the at least one first fastener and that is away from the side plates;

the second rotating shaft assembly further comprises at least one fourth fastener; and the at least one fourth fastener is sleeved onto the second connecting part, and the at least one fourth fastener is located on a side that is of the at least one second fastener and that is away from the side plates.

16. The hinge mechanism according to claim 15, wherein at least one first friction plate is disposed between the at least one first fastener and the at least one third fastener.

17. A protective case for an electronic device, comprising: a protective case body and a hinge mechanism, wherein the hinge mechanism comprises a first rotating shaft assembly, a second rotating shaft assembly, and a transmission part that cooperates with both the first rotating shaft assembly and the second rotating shaft assembly;

the first rotating shaft assembly is fixedly connected to a first portion of the protective case, and the first rotating shaft assembly is further rotatably connected to a second portion of the protective case;

the second rotating shaft assembly is fixedly connected to the second portion of the protective case, and the second rotating shaft assembly is further rotatably connected to a third portion of the protective case;

when the second portion of the protective case rotates relative to the first portion of the protective case by using the first rotating shaft assembly, the transmission part drives the third portion of the protective case to rotate relative to the second portion of the protective case by using the second rotating shaft assembly; and the second portion of the protective case is located between the first portion of the protective case and the third portion of the protective case;

the first rotating shaft assembly comprises: a first rotating shaft and a first fastening assembly rotatably connected to the first rotating shaft;

the first rotating shaft is fixedly connected to the second portion of the protective case, and the first fastening assembly is fixedly connected to the first portion of the protective case;

the second rotating shaft assembly comprises: a second rotating shaft and a second fastening assembly rotatably connected to the second rotating shaft; and the second rotating shaft is fixedly connected to the third portion of the protective case, and the second fastening assembly is fixedly connected to the second portion of the protective case.

18. The protective case for the electronic device according to claim 17, further comprising a wireless keyboard, wherein the wireless keyboard is located on the first portion.

19. The protective case for the electronic device according to claim 17, wherein the first fastening assembly comprises: a first fastening base and a first structural part fixedly connected to the first fastening base;

the first rotating shaft is rotatably connected to the first fastening base, and the first structural part is fixedly connected to the first portion of the protective case;

the second fastening assembly comprises: a second fastening base and a second structural part fixedly connected to the second fastening base; and the second rotating shaft is rotatably connected to the second fastening base, and the second structural part is fixedly connected to the second portion of the protective case.

20. The protective case for the electronic device according to claim 19, wherein the first fastening base comprises: a first base plate and two first side plates that are disposed opposite to each other; the two first side plates are both connected to the first base plate, and the two first side plates are located on a same side of the first base plate;

one end that is of each of the two first side plates and that is farthest away from the first base plate is provided with a first groove, and the first rotating shaft is located in the first groove;

the second fastening base comprises: a second base plate and two second side plates that are disposed opposite to each other; the two second side plates are both connected to the second base plate, and the two second side plates are located on a same side of the second base plate; and one end that is of each of the two second side plates and that is farthest away from the second base plate is provided with a second groove, and the second rotating shaft is located in the second groove.

* * * * *

UNITED STATES PATENT AND TRADEMARK OFFICE
CERTIFICATE OF CORRECTION

| | | |
|---|---|---|
| PATENT NO. | : 12,471,686 B2 | Page 1 of 1 |
| APPLICATION NO. | : 18/032252 | |
| DATED | : November 18, 2025 | |
| INVENTOR(S) | : Peng et al. | |

It is certified that error appears in the above-identified patent and that said Letters Patent is hereby corrected as shown below:

In the Claims

Column 22, Claim 12, Line 38, delete "portion part" and insert -- part --.

Signed and Sealed this
Thirteenth Day of January, 2026

John A. Squires
*Director of the United States Patent and Trademark Office*